United States Patent [19]

Narukawa et al.

[11] Patent Number: 5,634,090

[45] Date of Patent: May 27, 1997

[54] HOST BASED PRINTER HAVING AN IN-ADVANCE PRINTING MODE

[75] Inventors: Toshiki Narukawa, Kasugai; Norimichi Funahashi, Nisshin; Hajime Usami, Nagoya, all of Japan

[73] Assignee: Brother Kogyo Kabushiki Kaisha, Nagoya, Japan

[21] Appl. No.: 671,494

[22] Filed: Jun. 27, 1996

[30] Foreign Application Priority Data

Jun. 27, 1995 [JP] Japan ................................. 7-184791

[51] Int. Cl.$^6$ ............................................ G06K 15/00
[52] U.S. Cl. ........................ 395/115; 395/102; 395/114
[58] Field of Search ..................................... 395/102, 112, 395/113, 114, 115, 116, 509, 511, 514, 520, 521, 526, 872, 876, 877, 888, 894, 497.01, 497.02, 497.03, 497.04; 358/404, 426, 261.4, 444

[56] References Cited

U.S. PATENT DOCUMENTS

| | | | |
|---|---|---|---|
| 4,841,375 | 6/1989 | Nakajima et al. | |
| 5,068,805 | 11/1991 | Tsuzuki | 395/164 |
| 5,108,207 | 4/1992 | Isobe et al. | 395/115 |
| 5,206,741 | 4/1993 | Shimura et al. | 395/404 |

*Primary Examiner*—Arthur G. Evans
*Attorney, Agent, or Firm*—Oliff & Berridge

[57] ABSTRACT

In order that the reception buffer of a host based printer is unlikely to become full with image data transmitted from a host computer and to reduce the number of print interruptions caused by the fullness of the reception buffer, it is determined whether the reception buffer is in a first buffer-full state or in a second buffer-full state. The first buffer-full state is a state in which the reception buffer is full with image data and a page end code. The second buffer-full state is a state in which the reception buffer is full with image data but no page end code is contained therein. In the first buffer-full state, printing has already been started upon detection of the page end code and so an interruption signal for interruting the printing procedure will not be generated. In the second buffer-full state, an interruption signal is issued to start an in-advance printing if printing has not yet been started. When printing has already been started, no interruption signal is issued so that printing procedure can be continued.

16 Claims, 5 Drawing Sheets

HOST BASED PRINTER HAVING AN IN-ADVANCE PRINTING MODE

BACKGROUND OF THE INVENTION

1. Field of the Invention

The present invention relates to a host based printer for use in conjunction with a host computer, and more particularly to such a printer in which an error caused by fullness of a reception buffer is eliminated.

2. Description of the Related Art

Generally, printers receive code data from an external equipment and convert the code data to dot image data for printing. Because of a time needed for data conversion, there is a limit in increasing printing speed. Recently, host based printers have been extensively used. High performance personal computers are used as host computers which produce compressed dot image data and send the same to the host based printer.

The host based printer includes at least a transmission/reception circuit, a reception buffer, a DMA (direct memory access) controller, a decoding circuit, a line buffer, and a print controller. The transmission/reception circuit transmits data to the host computer and receives data therefrom. The reception buffer temporarily stores parallel compressed dot image data received from the host computer. The DMA controller, connected to both the transmission/reception circuit and the reception buffer, directly accesses the reception buffer to send the compressed dot image data stored therein to the decoding circuit. The decoding circuit decodes the compressed dot image data to reproduce the dot image data. The line buffer temporarily stores one raster line worth of dot image data and outputs serial data for supplying to a print driver. The host based printer is capable of performing a high speed decoding of the compressed dot image data to such an extent that the received compressed dot image data can be almost simultaneously printed.

The conventional host based printers will not start printing until a page end code is received. The page end code is representative of an end of the compressed image data on each page. Thereafter, each time when the page end code is received, the printers perform discharging of a printed sheet of paper and feeding a fresh sheet of paper through an interruption process. When the reception buffer becomes full before receipt of the page end code in a condition when printing has not yet been started, or when the reception buffer becomes full in a condition when printing has already been started, a print control is interrupted and an error process is executed during the interruption wherein an error message is displayed to indicate that the reception buffer has become full.

As described above, because the conventional host based printer does not start printing until one page worth of the image data is received at the reception buffer, the reception buffer is liable to become full before start of printing when a large amount of data is to be printed. Each time when the reception buffer becomes full before or after start of printing, an interruption process is executed to interrupt the print control and perform the error process during the interruption. Therefore, the print interruption occurs at a high frequency caused by fullness of the reception buffer and thus the print process is prosecuted with a low efficiency. Further problems exist such that the reception buffer with a small storage capacity is not available in the printer and the printer cannot draw customer's attention because of frequently occuring error processes.

SUMMARY OF THE INVENTION

In view of the foregoing, the present invention has been made to solve the aforementioned problems accompanying the conventional host based printers. Accordingly, it is an object of the present invention to provide a host based printer in which a reception buffer is not likely to become full before start of printing.

Another object of the present invention is to provide a host based printer in which occurrences of print interruption caused by fullness of the reception buffer is reduced.

Still another object of the present invention is to provide a host based priner in which the reception buffer with a small storage capacity is available.

To achieve the above and other objects, there is provided a host based printer for use in combination with a host computer including a reception buffer, a decoding circuit, a line buffer, printing means, print control means, first signal generating means, determining means, and a second signal generating means. The reception buffer is provided for receiving compressed image data and a page end code from the host computer in which the page end code represents an end of the compressed image data on each page. The decoding circuit is provided for decoding the compressed image data retrieved from the reception buffer and outputting dot image data. The line buffer is provided for storing the dot image data output from the decoding circuit and outputting the dot image data. The printing means is provided for printing dot images on a sheet of paper in accordance with the dot image data output from the line buffer. The print control means is provided for controlling the print means. The first signal generating means is provided for outputting a first signal to the print control means when the reception buffer receives the page end code. The print control means in turn controls the printing means to start printing when printing has not yet been started. The print control means also controls the printing means to feed the sheet of paper when printing has already been started. Specifically, the first signal is an interruption signal and in response thereto, an interruption process is implemented in which the printing means starts printing when the page end code is received at the reception buffer before start of printing and in which the printing means carries out feeding of the sheet of paper when the page end code is received thereat after start of printing.

The determining means determines whether the reception buffer is in a first buffer-full state or in a second buffer-full state. The first buffer-full state is a state in which the reception buffer is full with the compressed image data along with the page end code. The second buffer-full state is a state in which the reception buffer is full with the compressed image data but without the page end code. The second signal generating means is provided for outputting a second signal to the print control means when the determining means determines that the reception buffer is in the second buffer-full state before start of printing. The print control means controls the printing means to start printing in response to the second signal. The second signal generating means does not output the second signal to the print control means when the determining means determines that the reception buffer is in the first buffer-full state and in the second buffer-full state after start of printing. Therefore, when voluminous image data is received from the host computer and the reception buffer is brought to the second buffer-full state, the print control means controls the printing means to start printing through an interruption process in response to the second signal. Further, the second signal generating means does not output the second signal to the print control means when the reception buffer is brought to the first buffer-full state or to the second buffer-full state after start of printing. Accordingly, the printing procedure will not be interrupted by the interruption process.

The host based printer may further include data reception control means for outputting a transmission stop signal to the host commuter. The transmission stop signal instructs the host computer to temporarily stop transmission of the compressed image data when the determining means determines that the reception buffer is in the first buffer-full state or in the second buffer-full state. Therefore, the occurrences of transmission errors can be prevented. It is preferable that the determination by the determining means be performed when a small amount of available storage area remains in the reception buffer for allowing to store the compressed image data which may be transmitted from the host computer during a brief period of time between the time when determination of the first buffer-full state or the second buffer-full state is made and the time when the transmission is actually stopped.

The data reception control means further outputs a transmission resumption signal to the host computer when more than a predetermined amour of storage area in the reception buffer becomes available. The transmission resumption signal instructs the host computer to resume transmission of the compressed image data.

According to another aspect of the present invention, there is provided a host based printer including the reception buffer, the decoding circuit, the line buffer, the printing means including a sheet feeding mechanism for performing a sheet feed operation, and the print control means for controlling the print means, as described above. There is further provided first determining means for determining whether or not the reception buffer receives the page end code from the host computer. Detecting means is provided for detecting the page end code contained in the reception buffer. First signal generating means is provided for outputting a first signal to the print control means when the first determining means determines that the reception buffer receives the page end code. The print control means controls the printing means to start printing when printing has not yet been started and to perform the sheet feed operation when printing has already been started. Second determining means is provided for determining whether or not the reception buffer is full. Second signal generating means is provided for outputting a second signal to the print control means when the detection means does not detect the page end code in the reception buffer and when the second determinating means determines that the reception buffer is full.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

A preferred embodiment of the present invention will be described with reference to the accompanying drawings.

Figure 1:
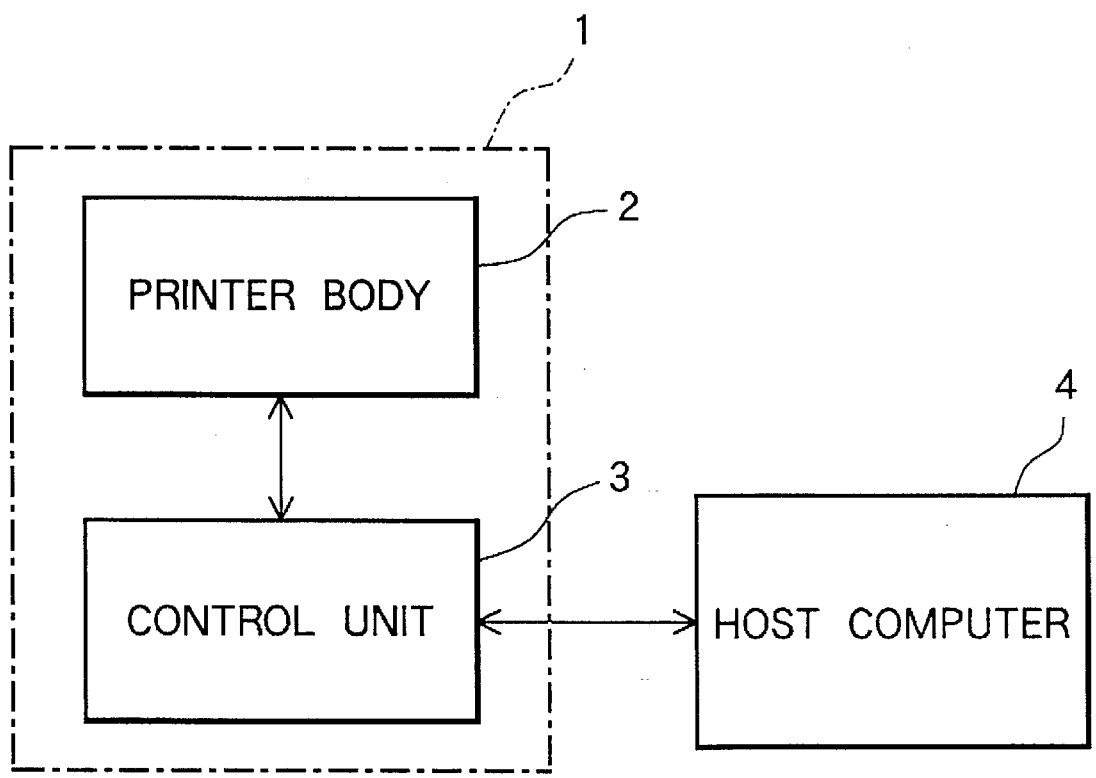
FIG. 1 is a block diagram showing a host based printer connected to a host computer according to an embodiment of the present invention.

As shown in FIG. 1, a host based printer 1 is connected via a parallel data cable to a personal computer serving as a host computer 4. The host based printer 1 receives image data in the form of compressed dot image from the host computer 4. The hardware arrangement of the host based printer 1 is similar to that of a conventional laser beam printer, so detailed description thereof is unnecessary. Briefly, the printer 1 is composed of a printer body 2 and a control unit 3. The printer body 2 includes a printing mechanism having a laser beam scanning unit, a paper feed mechanism, and so on. The control unit 3 controls such mechanisms included in the printer body 2.

Figure 2:
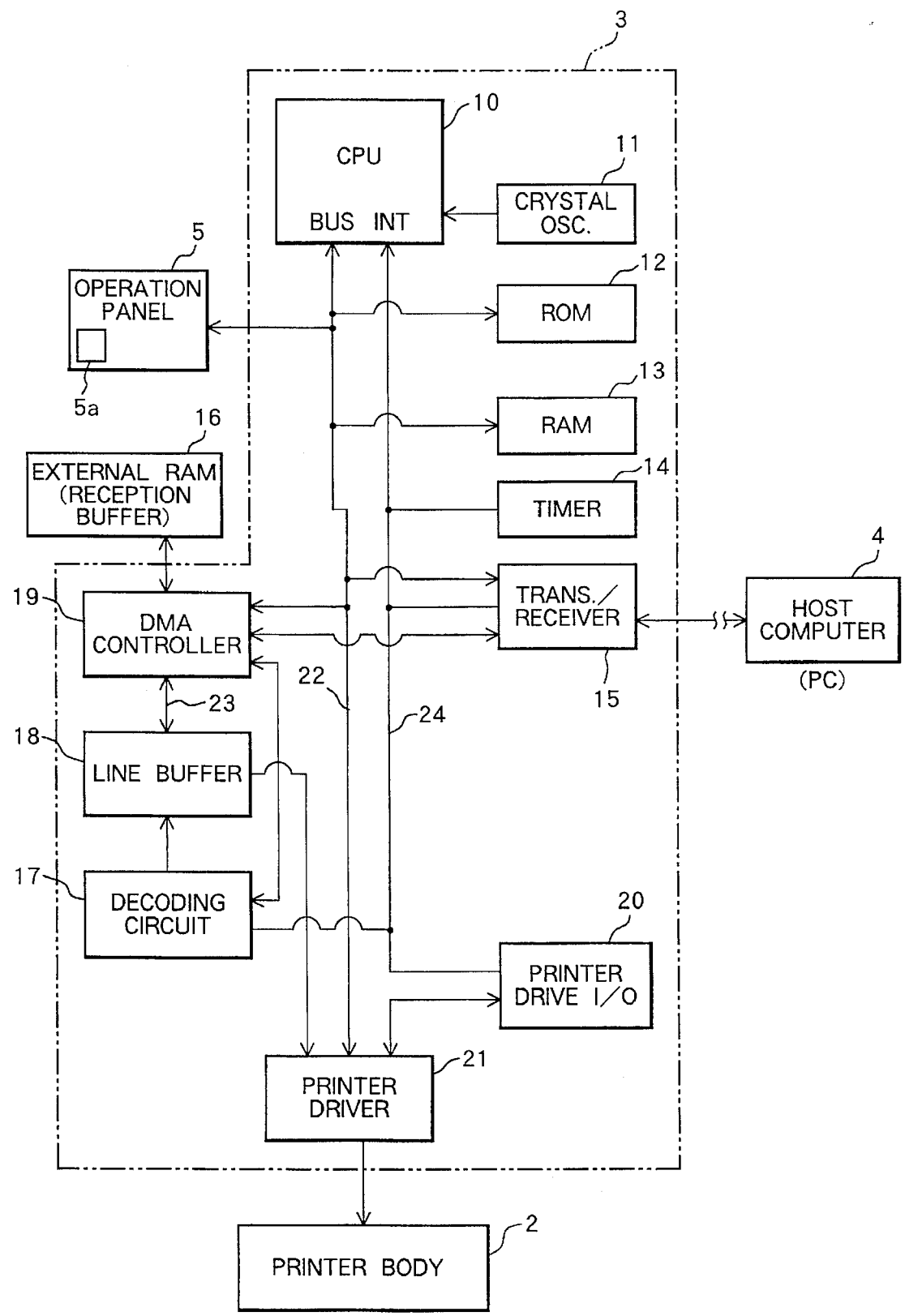
FIG. 2 is a block diagram showing a control unit of the host based printer according to the embodiment of the present invention.

As shown in FIG. 2, the control unit 3 includes an 8-bit CPU 10, a crystal oscillator 11, a ROM 12, and a RAM 13. The crystal oscillator 11 is connected to the CPU 10 and supplies 12.27 MHz clock pulses thereto. The ROM 12 stores various programs including a print control program and a buffer change-over control program. The RAM 13 has storage locations used as various work memories. The control unit 3 further includes a timer 14, a transmitter/receiver 15, an external RAM 16, a decoding circuit 17, a line buffer 18, a DMA controller 19, a printer drive I/O 20, and a printer driver 21. The timer 14 is connected to the CPU 10 and used for executing time base interruption. The transmitter/receiver 15 carries out data communication between the control unit 3 and the host computer 4. The external RAM 16 is optionally mounted on the control unit 3 and used as a reception buffer for temporarily storing the image data received from the host computer 4. Hereinafter the external RAM 16 will be referred to as "reception buffer 16". The decoding circuit 17 receives the image data from the reception buffer 16 and decodes the same. The line buffer 18 receives the decoded image data from the decoding circuit 17, temporarily stores the same, and serially outputs dot image data. The DMA controller 19 directly accesses the reception buffer 16 and the line buffer 18. An operation panel 5 is connected to the control unit 3 and is provided with a resolution setting switch 5a for setting a resolution of an image to be printed by the printer 1.

The ROM 12, RAM 13, transmitter/receiver 15, DMA controller 19 and printer driver 21 are connected to the CPU 10 via bus 22. The timer 14, transmitter/receiver 15, printer drive I/O 20, and decoding circuit 17 are connected to the CPU 10 via an interruption signal line 24. The DMA controller 19 is connected to the reception buffer 16, the line buffer 18, and the decoding circuit 17.

Parallel compressed image data from the host computer 4 is received at the transmitter/receiver 15 and temporarily stored in the reception buffer 16 under the aegis of the DMA controller 19. The image data is then retrieved from the reception buffer 16 and supplied to the decoding circuit 17 under the aegis of the DMA controller 19. In the decoding circuit 17, the compressed image data is decoded and the resultant image data representing dot images is supplied to the line buffer 18. The line buffer 18 in turn supplies the image data in the form of serial data to the printer driver 21. The printer driver 21 drives the print mechanism in accordance with a drive signal corresponding to the dot images represented by the image data. The data compression performed by the host computer 4 is basically the same as the MODE 9 proposed by Hewlett-Packard. The decoding circuit 17 is in the form of ASIC (application specified integrated circuit) including an interpreter for decoding the MODE 9 compressed image data and provide the image data representing dot images.

The resolution of the image to be printed by the printing mechanism can be changed to either 600 dpi (dots per inch) or 300 dpi. The change of the resolution can be achieved by an image-resolution conversion technology as disclosed, for example, in U.S. Pat. No. 4,841,375 to Nakajima et al. The reception buffer 16 is a ring buffer consisting of a plurality of blocks. The storage capacity of the reception buffer 16 is 0.5 MB but can be extended up to 4.0 MB. The number of blocks, leading and trailing addresses of each block, and the overall capacity of the reception buffer 16 are detected through a RAM check procedure. Information thus detected is stored in the address register of the RAM 13.

The DMA controller 19 is capable of directly accessing the reception buffer with a write block pointer for designating a block to be written, a read block point for designating a block to be read, a write pointer for designating a write address, a read pointer for designating a read address, and a control unit for controlling the DMA controller 19. The line buffer 18 has a 640 byte storage capacity capable of storing one raster (one dot line) worth of image data supplied when the resolution is 600 dpi. As will be described later, when the resolution is set to 300 dpi, a half of the capacity of the line buffer 18, i.e., 320 byte, is used as the reception buffer. In this case, the DMA controller 19 accesses the region of line buffer 18 acting as the reception buffer.

A reception buffer monitor control according to the embodiment of the present invention will next be described. The reception buffer monitor control is accompanied by the print control for controlling various mechanisms included in the printer body 2.

Because the host based printer 1 receives image data in the form of compressed dot image from the host computer 4, it is capable of performing a high speed printing as compared with other types of printers. The reception buffer monitor control prevents occurrences of the print interruptions, print overrun errors, and transmission/reception errors, to thereby enhance the efficiency in the print procedure. Further, the reception buffer monitor control enables the use a reception buffer with a small storage capacity.

Specifically, an in-advance print mode is implemented in which the printer driver 21 is operated when a page end code PEC representative of the end of the image data on a first page is received before start of printing, and also when the reception buffer 16 becomes full before receipt of the page end code PEC. After start of printing in the inadvance print mode, a paper feed operation, i.e., discharge of printed sheet and supply of a fresh sheet, is performed by way of an interruption process each time when the page end code PEC is received. When the reception buffer 16 becomes full, printing is not interrupted but the host computer 4 is instructed to temporarily stop transmission of the image data. When more than a predetermined amount (e.g. 1 kilo byte) of an empty area becomes available in the reception buffer 16 after interruption of the image data transmission, the host computer 4 is instructed to resume transmission of the image data. In this manner, occurrences of print overrun error and/or data communication error are prevented.

Figure 4:
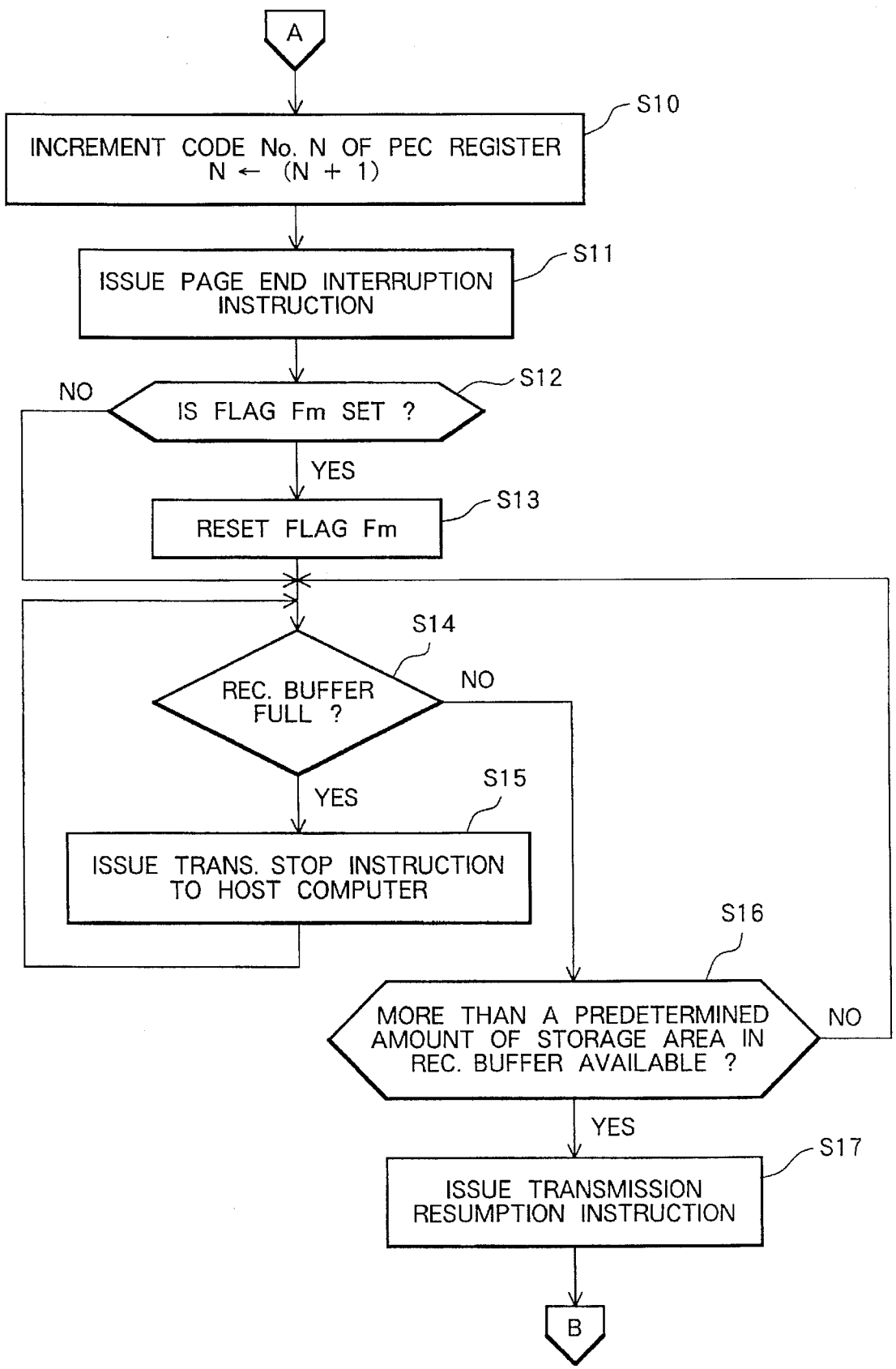
FIG. 4 is a second part of flowchart illustrating the program of the reception buffer monitor control according to the embodiment of the present invention.
Figure 5:
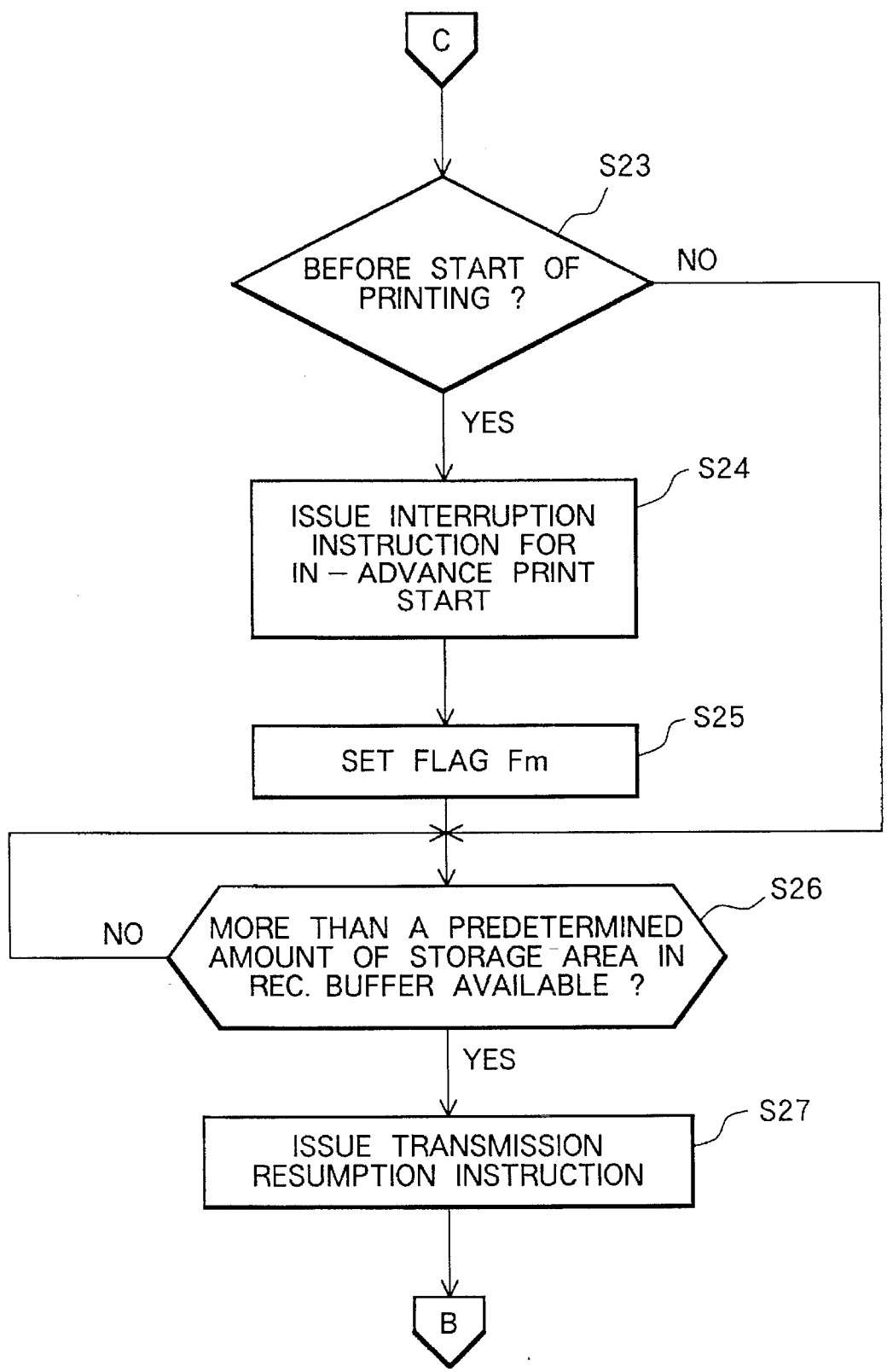
FIG. 5 is a third part of flowchart illustrating the program of the reception buffer monitor control according to the embodiment of the present invention.

The reception buffer monitor control will be described while referring to the flowcharts shown in FIGS. 3 to 5. In the following description, Si (i=1, 2, . . .) indicates step numbers.

Figure 3:
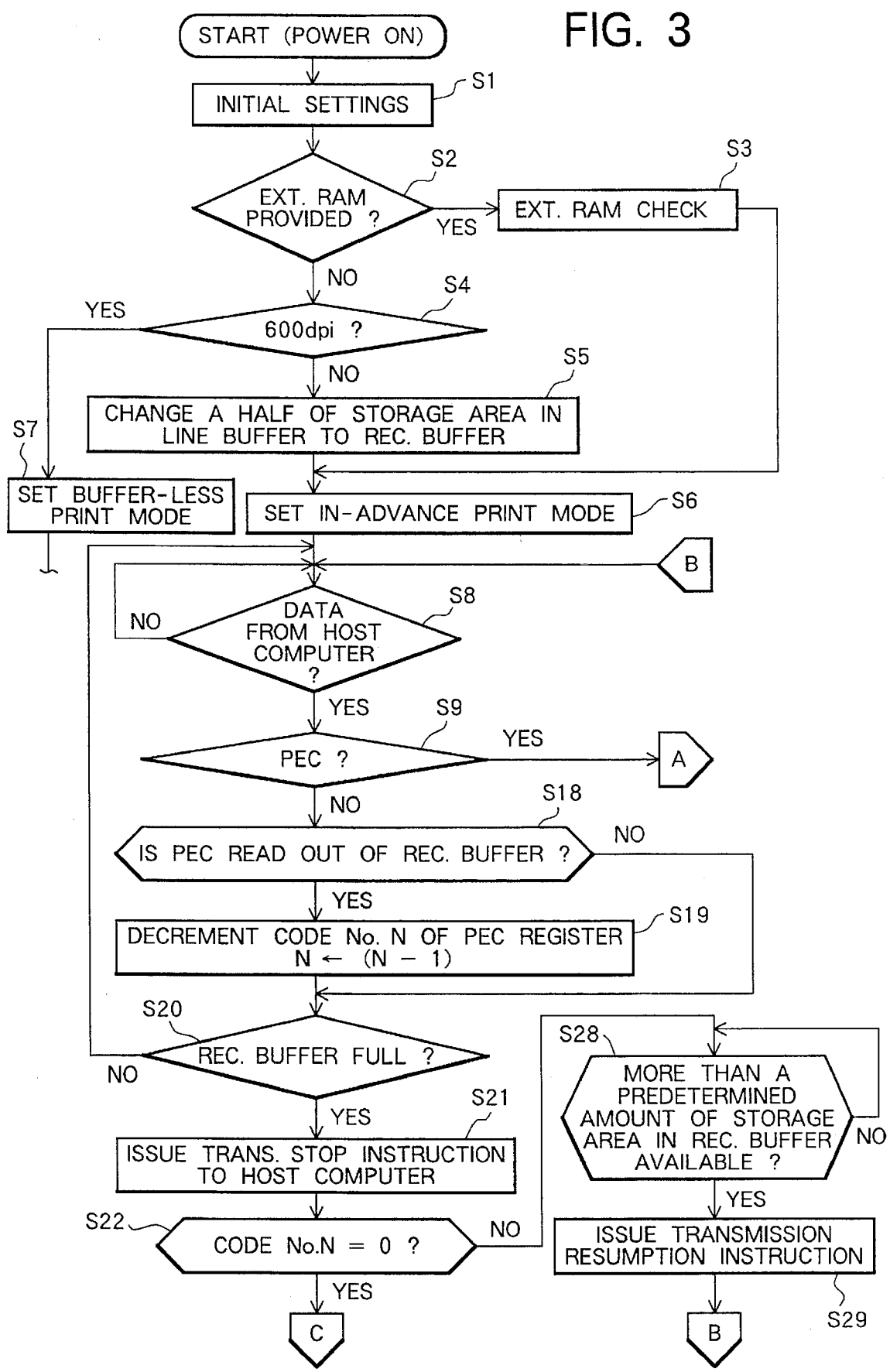
FIG. 3 is a first part of flowchart illustrating a program of a reception buffer monitor control according to the embodiment of the present invention.

As shown in the flowchart of FIG. 3, the reception buffer monitor control starts when the printer 1 is powered, whereupon initial settings are performed (S1). In the initial settings, an in-advance print flag Fm (to be described later) stored in a work memory is reset and the code number N of the PEC register is reset to zero (0). Next, whether or not the external RAM 16 is provided is investigated (S2). If the investigation results indicate that the external RAM 16 is provided (S2: YES), a RAM check for the external RAM 16 is executed. Address data of the external RAM 16 obtained as a result of the RAM check is stored in the address register of the RAM 13 and also set to the DMA controller 19, whereupon the routine proceeds to S6.

When the external RAM 16 is not mounted on the control unit 3 (S2: NO), it is determined whether or not the print resolution is set to 600 dpi based on the signal from the resolution setting switch 5a provided on the operation panel 5 (S4). When the resolution is set to 600 dip (S4: YES), the routine proceeds to S7. When the external RAM 16 is not mounted thereon and the resolution is set to 300 dip S4: NO), a half of the storage area in the line buffer 18 is changed to a reception buffer (S5). In this case, the DMA controller 19 is set so that the half of the storage area in the line buffer 18 is used as the reception buffer. In S6, an in-advance print mode flag is set so that the in-advance printing is carried out in which printing is started when the reception buffer 16 has become full with the compressed image data before receiving the page end code PEC. Thereafter, the routine proceeds to S8.

When the determination made in S4 indicates that the resolution is 600 dpi (S4: YES), the buffer-less print mode is set (S7) in which printing is carried out without using the reception buffer. Specifically, the received image data is directly received at the decoding circuit 17 and is decoded therein. The decoded data is in turn supplied to the line buffer 18 for printing. The buffer-less print mode is implemented by the DMA controller 19. The present embodiment will be described with respect to the case where the external RAM 16 is not provided and the in-advance print mode is set.

When the image data is received from the host computer 4 (S8: YES), it is determined whether or not the received data is the page end code attached to the end of the image data on each page (S9). When the received data is the page end code PEC (S9: YES), the code number N of the PEC register that is provided in the work memory is incremented to (N+1) in S10 of the flowchart shown in FIG. 4. The code number N indicates the code number of the page end code PEC stored in the reception buffer 16.

In S11, a page end interruption instruction is issued to the print control being executed by the CPU 10. In response to the page end interruption instruction, printing is started through an interruption process if printing has not yet been started. If printing has already been started, the image data received before receipt of the page end code PEC and stored in the reception buffer 16 is sent out for printing. Further, discharge of printed sheet of paper and supply of fresh sheet of paper are performed through an interruption process.

Next, in S12, it is determined whether an in-advance print flag Fm is set or rest. This flag Fm will be set in S25 as will be described later. If the flag Fm has been set after start of in-advance printing (S12: YES), the flag Fm is reset so that in-advance printing for the following page can be performed (S13), whereupon the routine proceeds to S14. When the flag Fm is reset (S12: No), the routine skips to S14. In S14, it is determined whether the reception buffer 16 is full or not. In this case, data designated by the block pointer and the address pointer in the DMA controller 18 are read. The reception buffer 16 is determined to be full when the write address catches up with the read address after circulation of the ring buffer ahead of the read address.

When the reception buffer 16 is full (S14: YES), which will hereinafter be referred to as "first buffer-full state", a transmission stop instruction is issued through the transmitter/receiver 15 to the host computer 4 requesting to temporarily stop transmission of the image data, whereupon the routine returns to S14. During interruption of the image data reception in the control unit 3, printing proceeds with the image data stored in the reception buffer 16. Accordingly, empty area in the reception buffer 16 increases with time and so the determination made in S14 is changed to NO. Then, in S16, it is determined whether the empty area in the reception buffer 16 exceeds a predetermined amount (for example, 1 kilo byte). If NO, the routine returns to S14. When the determination made in S14 is changed to YES, a transmission resumption instruction is issued via the transmitter/receiver 15 to the host computer 4 instructing to resume transmission of the image data (S17). Thereafter, the routine returns to S8 and the processes of S8 and on are repeatedly executed.

When the determination made in S9 is NO, it is determined whether or not the page end code PEC is read out of the reception buffer 16 (S18). When the determination made in S18 indicates YES, the code number N of the PEC register is decremented to (N−1) (S19). Next, it is determined whether or not the reception buffer 16 is full (S20). When the determination made in S20 is NO, the routine returns to S8. When the reception buffer 16 is full (S20: YES), a transmission stop instruction is issued to the host computer 4 as is done in S15 (S21). Next, it is determined whether or not the code number N of the PEC register is 0 (zero), that is, whether or not the page end code is stored in the reception buffer 16 (S22).

When the determination made in S22 is YES, that is, when the page end code PEC is not stored in the reception buffer 16, it is assumed that the reception buffer 16 is in the second buffer-full state. In this case, it is determined whether or not printing has started in S23 of the flowchart shown in FIG. 5. If printing has not yet started, the determination made in S23 is YES. Then, the CPU 10 issues an interruption instruction to the print control being executed by the CPU 10 instructing to start the in-advance print (S24), whereupon the in-advance print flag Fm is set (S25) and then the routine proceeds to S26. In the interruption process responsive to the interruption instruction for starting the in-advance print, the print mechanism is instructed to start printing before receipt of the page end code PEC. When the determination made in S23 is NO, the routine proceeds to S26.

Because printing starts without receiving the image data from the host computer 4, the empty area of the reception buffer 16 increases. In S26, it is determined whether or not the empty area of the reception buffer 16 exceeds the predetermined amount (for example, 1 kilo byte). When the determination made in S26 is N0, this determination is repeatedly carried out. When the empty area of the reception buffer 16 exceeds the predetermined amount (S26: YES), a transmission resumption instruction is issued to the host computer 4 as is done in S17 (S28), and thereafter the routine returns to S8 and the processes of S8 and on are repeatedly executed.

On the other hand, when the determination made in S22 is NO, that is, when the reception buffer 16 is full and the page end code PEC is stored in the reception buffer 16, it is determined whether or not the empty area of the reception buffer 16 is more than a predetermined amount (S28) as is done in S16. This determination is repeatedly carried out until the affirmative result is obtained. When the empty area of the reception buffer 16 exceeds the predetermined amount (S28: YES), a transmission resumption instruction is issued to the host computer 4 (S29) as done in S17. Thereafter, the routine returns to S8 and the processes in S8 and on are repeatedly executed.

In the above-described embodiment, the page end interruption instruction is issued to the print control each time when the page end code PEC is received. Therefore, in the interruption process responsive to this interruption instruction, when printing has not yet been started, printing is started, and when print has already been started, the paper exchange is carried out.

Further, the code number N of the page end code PEC stored in the reception buffer 16 is counted at all times through the PEC register. Therefore, the first buffer-full state in which the reception buffer 16 has become full with the image data containing the page end code PEC and the second buffer-full state in which the reception buffer 16 has become full with the image data which does not contain the page end code PEC, can be discriminated.

In the first buffer-full state, printing has already been started in accordance with the process in S11, so that no interruption instruction is issued and hence printing is not interrupted by the interruption process but printing is continuously performed. In the second buffer-full state as executed in S23 through S25, the interruption instruction is issued to the print control so as to start the in-advance printing only when printing has not yet been started. When printing has already been started, no interruption instruction is issued, so that printing is not interrupted by the interruption process but printing is continuously performed.

In this manner, interruption instructions other than the in-advance print start interruption instruction are not issued and printing is continued in the first or second buffer-full state. Accordingly, the efficiency in the print procedure is greatly improved.

Even the page end code PEC has not yet been received, the in-advance printing is started in the second buffer-full state, so that occurrences of the buffer full errors including print overrun error and transmission error can be prevented.

In addition, when the reception buffer 16 becomes full, the transmission stop instruction is issued to the host computer 4 to temporarily stop transmission of the image data as executed in S15, therefore, occurrences of the buffer full errors can be prevented. When the empty area of the reception buffer 16 exceeds more than a predetermined amount, the transmission resumption instruction is issued to the host computer 4 to resume transmission of the image data. Therefore, occurrence of the buffer full error can be prevented and the duration in which the transmission of the image data is interrupted can be set to minimum. Because various solutions are prepared for the cases where the reception buffer 16 becomes full, the reception buffer 16 can be of a small-size and small storage capacity.

While an exemplary embodiment of this invention has been described in detail, those skilled in the art will recognize that there are many possible modifications and variations which may be made in the exemplary embodiment while yet retaining many of the novel features and advantages of the invention. For example, although in S14 and S21, it is determined whether or not the reception buffer 16 is full, the determination that the reception buffer 16 has become full may be made when the residual amount of storage area in the reception buffer 16 is less than a predetermined amount that is set in view of the transmission speed of the image data. Because in the described embodiment, a small amount of image data may be transmitted during a brief period of time from the time when the reception buffer 16 has become full until the time when the transmission of the image data is stopped responsive to the transmission stop instruction. Further, the resolutions of 600 dpi and 300 dpi are exemplified in the above embodiment, but the print density can be set to another values. The storage capacity of the line buffer 18 may be set in association with the resolution.

What is claimed is:

1. A host based printer for use in combination with a host computer, comprising:

a reception buffer for receiving compressed image data and a page end code from said host computer, the page end code representing an end of the compressed image data on each page;

a decoding circuit for decoding the compressed image data retrieved from said reception buffer and outputting dot image data;

a line buffer having a storage area for storing the dot image data output from said decoding circuit and outputting the dot image data;

printing means for printing dot images on a sheet of paper in accordance with the dot image data output from said line buffer, the dot images having a resolution defined by a printable dot number per a unit length;

print control means for controlling said print means;

first signal generating means for outputting a first signal to said print control means when said reception buffer receives the page end code, wherein said print control means controls said printing means to start printing when printing has not yet been started and to feed the sheet of paper when printing has already been started;

determining means for determining whether said reception buffer is in a first buffer-full state or in a second buffer-full state, the first buffer-full state being a state in which said reception buffer is full with the compressed image data and the page end code, the second buffer-full state being a state in which said reception buffer is full with the compressed image data without containing the page end code; and second signal generating means for outputting a second signal to said print control means when said determining means determines that said reception buffer is in the second buffer-full state before start of printing, wherein said print control means controls said printing means to start printing in response to the second signal.

2. A host based printer according to claim 1, further comprising page end code detecting means for detecting the page end code received at said reception buffer and producing a detection signal, and wherein said first signal generating means outputs the first signal in response to the detection signal.

3. A host based printer according to claim 2, wherein said printing means includes a sheet feeding mechanism for performing a sheet feed operation, and wherein when said page end code detecting means detects the page end code, said print control means controls said sheet feeding mechanism to perform the sheet feed operation, if printing has already been started at the time of detection of the page end code.

4. A host based printer according to claim 1, further comprising data reception control means for outputting a transmission stop signal to said host computer, the transmission stop signal instructing said host computer to temporarily stop transmission of the compressed image data when said determining means determines that said reception buffer is in the first buffer-full state or in the second buffer-full state.

5. A host based printer according to claim 4, wherein said determining means determines whether said reception buffer is in the first buffer-full state or in the second buffer-full state when a predetermined amount of available storage area remains in said reception buffer.

6. A host based printer according to claim 4, wherein said data reception control means further outputs a transmission resumption signal to said host computer when more than a predetermined amount of storage area in said reception buffer becomes available, the transmission resumption signal instructing said host computer to resume transmission of the compressed image data.

7. A host based printer according to claim 1, further comprising resolution selecting means for selecting one from at least a first resolution and a second resolution lower than the first resolution, and wherein said print control means controls said print means to print the dot images with either the first resolution or the second resolution selected by said resolution selecting means.

8. A host based printer according to claim 7, further comprising buffer switching means for switching a part of the storage area of said line buffer to an extended storage area of said reception buffer when said resolution selecting means selects the second resolution.

9. A host based printer according to claim 8, wherein the part of the storage area of said line buffer to be switched to the extended storage area of said reception buffer is determined by a ratio of the second resolution to the first resolution.

10. A host based printer for use in combination with a host computer, comprising:

a reception buffer for receiving compressed image data and a page end code from said host computer, the page end code representing an end of the compressed image data on each page;

a decoding circuit for decoding the compressed image data retrieved from said reception buffer and outputting dot image data;

a line buffer having a storage area for storing the dot image data output from said decoding circuit and outputting the dot image data;

printing means for printing dot images on a sheet of paper in accordance with the dot image data output from said line buffer, the dot images having a resolution defined by a printable dot number per a unit length, said printing means including a sheet feeding mechanism for performing a sheet feed operation;

print control means for controlling said print means;

first determining means for determining whether or not said reception buffer receives the page end code from said host computer;

detecting means for detecting the page end code contained in said reception buffer;

first signal generating means for outputting a first signal to said print control means when said first determining means determines that said reception buffer receives the page end code, wherein said print control means controls said printing means to start printing when printing has not yet been started and to perform the sheet feed operation when printing has already been started;

second determining means for determining whether or not said reception buffer is full; and second signal generating means for outputting a second signal to said print control means when said detection means does not detect the page end code in said reception buffer and when said second determining means determines that said reception buffer is full.

11. A host based printer according to claim 10, further comprising data reception control means for outputting a transmission stop signal to said host computer when said second determining means determines that said reception buffer is full, the transmission stop signal instructing said host computer to temporarily stop transmission of the compressed image data.

12. A host based printer according to claim 11, wherein said second determining means determines whether said reception buffer is in the first buffer-full state or in the second buffer-full state when a predetermined amount of available storage area remains in said reception buffer.

13. A host based printer according to claim 11, wherein said data reception control means further outputs a transmission resumption signal to said host computer when more than a predetermined amount of storage area in said reception buffer becomes available, the transmission resumption signal instructing said host computer to resume transmission of the compressed image data.

14. A host based printer according to claim 10, further comprising resolution selecting means for selecting one of a first resolution and a second resolution lower than the first resolution, and wherein said print control means controls said print means to print the dot images with either the first resolution or the second resolution selected by said resolution selecting means.

15. A host based printer according to claim 14, further comprising buffer switching means for switching a part of the storage area of said line buffer to an extended storage area of said reception buffer when said resolution selecting means selects the second resolution.

16. A host based printer according to claim 15, wherein the part of the storage area of said line buffer to be switched to the extended storage area of said reception buffer is determined by a ratio of the second resolution to the first resolution.

* * * * *